(12) United States Patent
Kwan (10) Patent No.: US 10,192,288 B2
(45) Date of Patent: Jan. 29, 2019

(54) METHOD AND SYSTEM FOR GENERATING HIGH RESOLUTION WORLDVIEW-3 IMAGES

(71) Applicant: Signal Processing, Inc., Rockville, MD (US)

(72) Inventor: Chiman Kwan, Rockville, MD (US)

(73) Assignee: Signal Processing, Inc., Rockville, MD (US)

( * ) Notice: Subject to any disclaimer, the term of this patent is extended or adjusted under 35 U.S.C. 154(b) by 164 days.

(21) Appl. No.: 15/389,496

(22) Filed: Dec. 23, 2016

(65) Prior Publication Data

US 2018/0182068 A1 Jun. 28, 2018

(51) Int. Cl.
| | |
|---|---|
| G06K 9/32 | (2006.01) |
| G06T 3/40 | (2006.01) |
| G06T 5/50 | (2006.01) |
| G06K 9/00 | (2006.01) |
| G06K 9/46 | (2006.01) |
| G06K 9/62 | (2006.01) |

(52) U.S. Cl.
CPC .......... G06T 3/4061 (2013.01); G06K 9/0063 (2013.01); G06K 9/4628 (2013.01); G06K 9/6267 (2013.01); G06T 5/50 (2013.01); G06K 2009/00644 (2013.01); G06T 2207/10036 (2013.01); G06T 2207/10041 (2013.01); G06T 2207/10048 (2013.01); G06T 2207/30181 (2013.01)

(58) Field of Classification Search
None
See application file for complete search history.

(56) References Cited

U.S. PATENT DOCUMENTS

| | | | | |
|---|---|---|---|---|
| 7,620,203 B1 * | 11/2009 | Simmons | ............. | G06K 9/0063 382/103 |
| 8,594,375 B1 * | 11/2013 | Padwick | ............. | G06K 9/0063 382/103 |
| 8,761,506 B1 * | 6/2014 | Padwick | ............. | G06K 9/0063 382/167 |

(Continued)

OTHER PUBLICATIONS

The utility of IRS-1C LISS-III and PAN-merged data for mapping salt-affected soils, R.S.Dwivedi et al., ResearchGate, 2001, pp. 1167-1175 (Year: 2001).*

(Continued)

*Primary Examiner* — Jayesh A Patel
(74) *Attorney, Agent, or Firm* — IP-R-US, LLC; Peter S. Wong (57) ABSTRACT

The present invention presents four fusion approaches, which can be directly applied to Worldview-3 (WV-3) images. Moreover, they can also be applied to other current or future satellite images that have similar characteristics of WV-3. The present invention also presents data processing methods, including image fusion method, anomaly detection method, material classification method, and concentration estimation method that utilize the high-resolution images generated by the mentioned fusion methods. There are four fusion approaches disclosed in the present invention, e.g. Parallel one-step fusion approach; Sequential fusion of various bands; Sequential-Parallel fusion; and Parallel-Sequential fusion.

3 Claims, 8 Drawing Sheets

Approach 1: Parallel one-step approach.

(56) References Cited

U.S. PATENT DOCUMENTS

| | | | | |
|---|---|---|---|---|
| 9,041,822 | B2* | 5/2015 | Qian | H04N 5/349 348/218.1 |
| 9,426,401 | B2* | 8/2016 | Twede | H04N 5/378 |
| 2008/0129752 | A1* | 6/2008 | Riley | G06T 5/50 345/629 |
| 2009/0318815 | A1* | 12/2009 | Barnes | A61B 5/742 600/473 |
| 2009/0326383 | A1* | 12/2009 | Barnes | A61B 5/0059 600/476 |
| 2011/0033129 | A1* | 2/2011 | Robinson | G01J 3/2823 382/254 |
| 2014/0267759 | A1* | 9/2014 | Leonard | H04N 5/33 348/164 |
| 2014/0270332 | A1* | 9/2014 | Pacifici | G06T 5/001 382/100 |
| 2015/0371431 | A1* | 12/2015 | Korb | G06T 9/00 382/113 |
| 2016/0020848 | A1* | 1/2016 | Leonard | H04B 7/18528 370/316 |
| 2017/0251134 | A1* | 8/2017 | Zhang | G01J 3/28 |

OTHER PUBLICATIONS

A Tutorial Overview of Anomaly Detection in Hyperspectral images, Stefania et al., IEEE 0018-9251, pp. 5-27 (Year: 2010).*

Mineral mapping using simulated short-wave-infrared bands planned for DigitaGlobe worldview-3, Kruse Fred, A. et al., 2012, Calhoun, pp. 1-4 (Year: 2012).*

Mineral mapping using simulated worldview-3 short-Wave-Infrared imagery, Fred A. Kruse et al.,Remote sens. 2013, ISSN 2072-4292, pp. 2689-2703 (Year: 2013).*

Hyperspectral image super resolution: a hybrid color mapping approach. Jin Zhou et al. Jul.-Sep. 2016, pp. 1-20 (Year: 2016).*

J. Zhou, C. Kwan, and B. Budavari, "Hyperspectral Image Super-Resolution: A Hybrid Color Mapping Approach," SPIE Journal of Applied Remote Sensing, Sep. 2016.

C. Kwan, J. H. Choi, S. Chan, J. Zhou, and B. Budavari, "Resolution Enhancement for Hyperspectral Images: A Super-Resolution and Fusion Approach," Proc. Int. Conf. Acoustics, Speech, and Signal Processing, New Orleans, Mar. 2017.

H. Kwon, N.M. Nasrabadi, "Kernel RX-algorithm: A nonlinear anomaly detector for hyperspectral imagery," IEEE Transactions on Geoscience and Remote Sensing, vol. 43, No. 2, Feb. 2005.

C. Kwan, B. Ayhan, G. Chen, C. Chang, J. Wang, and B. Ji, "A Novel Approach for Spectral Unmixing, Classification, and Concentration Estimation of Chemical and Biological Agents," IEEE Trans. Geoscience and Remote Sensing, pp. 409-419, vol. 44, No. 2, Feb. 2006.

Y. Benggio, A. Courville, and P. Vincent, "Representation Learning: A Review and New Perspectives," IEEE Transactions on Pattern Analysis and Machine Intelligence, 2013.

J. Zhou, C. Kwan, B. Ayhan, and M. Eismann, "A Novel Cluster Kernel RX Algorithm for Anomaly and Change Detection Using Hyperspectral Images," IEEE Trans. Geoscience and Remote Sensing, vol. 54, Issue: 11, pp. 6497-6504, Nov. 2016.

M. Dao, C. Kwan, B. Ayhan, and T. Tran, "Burn Scar Detection Using Cloudy MODIS Images via Low-rank and Sparsity-based Models," IEEE Global Conference on Signal and Information Processing, Greater Washington, D.C., USA, Dec. 7-9, 2016.

* cited by examiner

Fig. 1: Approach 1: Parallel one-step approach.

Fig. 2: Approach 2: Sequential fusion of various bands.

Fig. 3: Approach 3: Sequential-parallel fusion.

Fig. 4: Approach 4: Parallel-sequential fusion.

Fig. 5: System flow of color mapping for generating high spatial resolution hyperspectral images.

Fig. 6: Hybrid Color Mapping. Multispectral bands with the addition of a white band.

Fig.7: Local Color Mapping.

Fig. 8: Comparison of spatial resolution enhancement methods, showing Hybrid Color Mapping algorithm yielded much better classification accuracy.

Fig.9: ROC curves using anomaly detection results, showing the performance of CKRX and KRX reaching optimal performance as compared to others.

Fig. 10: Illustrative diagram of the global version of the sparsity-driven face recognition method.

(a) Illuminations from 1-32 for Subject-1  (b) Illuminations from 33-64 for Subject-1

Fig. 11: Face images of Subject-1 in 64 different lighting conditions in the Yale B face database.

Fig. 12: Classification results of both poor illuminated images as well as rotated images.

Fig. 13 Preliminary results with the adaptation of DBN technique to chemical composition estimation in LIBS. RMSEP values for each oxide compound.

METHOD AND SYSTEM FOR GENERATING HIGH RESOLUTION WORLDVIEW-3 IMAGES

BACKGROUND OF THE INVENTION

Worldview-3 (WV-3) is the industry's first super-spectral, Very-High Resolution (VHR) commercial satellite, with sensors having panchromatic resolutions of 31 cm; Multispectral, also known as Visible Near Infrared (VNIR), resolutions of 1.2 m; and Short Wave Infrared (SWIR) resolutions of 7.5 m (3.72 m native), as shown in Table 1 below. These sensors have a geo-positional accuracy of less than 3.5 m CE90. The WV-3 has an average revisit time of less than 1 day, and it can collect up to 680,000 km$^2$ per day.

TABLE 1

Multispectral response of the Very High Resolution (VHR) WorldView-3 (WV-3) sensors.
Panchromatic: 450-800 nm

| 8 Multispectral: | | | |
| --- | --- | --- | --- |
| Coastal: | 400-450 nm | Red: | 630-690 nm |
| Blue: | 450-510 nm | Red Edge: | 705-745 nm |
| Green: | 510-580 nm | Near-IR1: | 770-895 nm |
| Yellow: | 585-625 nm | Near-IR2: | 860-1040 nm |
| 8 SWIR Bands: | | | |
| SWIR-1: | 1195-1225 nm | SWIR-5: | 2145-2185 nm |
| SWIR-2: | 1550-1590 nm | SWIR-6: | 2185-2225 nm |
| SWIR-3: | 1640-1680 nm | SWIR-7: | 2235-2285 nm |
| SWIR-4: | 1710-1750 nm | SWIR-8: | 2295-2365 nm |

It is well known that images with multiple bands have better discrimination than images with fewer bands. For example, a Red-Green-Blue (R-G-B) color image has much better discrimination capability than gray-level images. Since the WV-3 data have sixteen bands, excluding the panchromatic band, with different resolutions, it will be ideal to fuse them to generate sixteen VHR images. Although there have been many algorithms in the literature for fusing images with different bands, this field is still evolving with new algorithms introduced from time to time.

As discussed in a paper, "Kernel RX-algorithm: A nonlinear anomaly detector for hyperspectral imagery," IEEE Transactions on Geoscience and Remote Sensing, Vol. 43, No. 2, February 2005, by H. Kwon, and N. M. Nasrabadi, the Kernel RX-algorithm is a generalization of the well-known anomaly detection algorithm, known as Reed-Xiaoli (RX) algorithm. When the kernel distance function is defined as the dot product of two vectors, Kernel RX is the same as RX. While Kernel RX is more flexible than RX, it is significantly slower than RX. A novel algorithm can perform a fast approximation of Kernel RX in the present invention, as disclosed in an article, "A Novel Cluster Kernel RX Algorithm for Anomaly and Change Detection Using Hyperspectral Images," IEEE Trans. Geoscience and Remote Sensing, Volume: 54, Issue: 11, pp. 6497-6504, November 2016, by J. Zhou, C. Kwan, B. Ayhan, and M. Eismann. The novel algorithm is based on clustering, called Cluster Kernel RX (CKRX). As a matter of fact, CKRX is a generalization of Kernel RX (KRX), i.e. CKRX is reduced to Kernel RX under some specific settings.

The basic idea of CKRX is: first cluster the background points and then replace each point with its cluster's center. After replacement, the number of unique points is the number of clusters, which can be very small comparing to the original point set. Although the total number of points does not change, the computation of the anomaly value can be simplified using only the unique cluster centers, which improves the speed by several orders of magnitudes.

Figure 9:
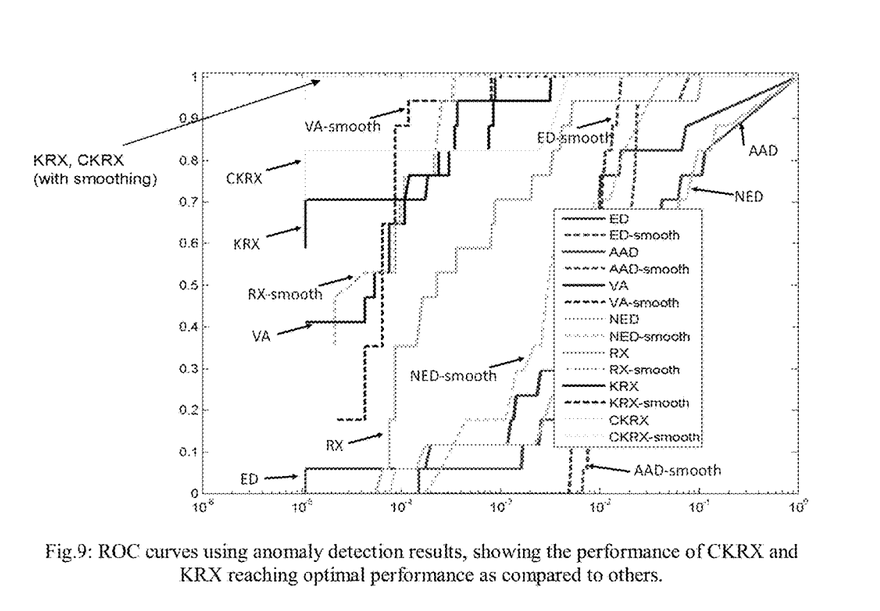
FIG. 9 illustrates receiver operating characteristics (ROC) curves using anomaly detection results. The performance of Cluster Kernel Reed-Xiaoli (CKRX) and Kernel Reed-Xiaoli (KRX) reached almost an optimal performance as compared to others.

The paper mentioned above showed that some Receiver Operating Characteristics (ROC) curves were obtained by using actual hyperspectral images from the Air Force (AF). Many algorithms implemented and compared in that paper. Also, FIG. 9 of the present invention shows the ROC curves, showing that KRX and CKRX gave excellent performance, as their ROC curves almost reach ideal performance.

In surface characterization, accurate material classification is important for mapping out the Earth surface. There are some existing classification algorithms as shown in the article, "A Novel Approach for Spectral Unmixing, Classification, and Concentration Estimation of Chemical and Biological Agents," IEEE Trans. Geoscience and Remote Sensing, pp. 409-419, vol. 44, no. 2, February 2006, by C. Kwan, B. Ayhan, G. Chen, C. Chang, J. Wang, and B. Ji.

In remote sensing domain, a common and successful approach to achieving super resolution is pan-sharpening. Pan-sharpening is an image fusion technique which uses a high resolution single band panchromatic image and low resolution multi-spectral image to produce high resolution multi-spectral images. Compared to multi-view based and example based super-resolution technique, pan-sharpening can produce much higher resolution data and is much more reliable and accurate. The pan-sharpening idea can also be applied to hyperspectral images, as disclosed in some articles, for example, "Hyperspectral Image Super-Resolution: A Hybrid Color Mapping Approach," SPIE Journal of Applied Remote Sensing, September, 2016, by J. Zhou, C. Kwan, and B. Budavari; and "Resolution Enhancement for Hyperspectral Images: A Super-Resolution and Fusion Approach," accepted by International Conference Acoustics, Speech, and Signal Processing 2017, by C. Kwan, J. H. Choi, S. Chan, J. Zhou, and B. Budavari. In the present invention, a novel approach which extends the idea of pan-sharpening by using multiple high resolution bands to reconstruct high resolution hyperspectral image was developed. The motivation is practical: there are many satellite sensors or airborne sensors which take high resolution color images. For instance, the resolution of IKONOS color image data is 0.5 meter.

Sparsity based classification algorithm to rock type classification such as the method described in an article, "Burn Scar Detection Using Cloudy MODIS Images via Low-rank and Sparsity-based Models," IEEE Global Conference on Signal and Information Processing, Washington, D.C., Dec. 7-9, 2016, by M. Dao, C. Kwan, B. Ayhan, and T. Tran.

The Extended Yale B face database, as disclosed in an article, "Locally Adaptive Sparse Representation for Detection, Classification, and Recognition," Signals and Systems Area Seminar, Johns Hopkins University, Baltimore Md., by T. D. Tran, has been used for performance evaluation. In addition to frontal face images, the present invention introduced rotation effects to the test face images to examine the robustness of the global (whole face) and local (blocks of the face image) versions of the method. The Yale B database contains face images with different illuminations, which are very challenging.

Support Vector Machine (SVM) and non-deep Neural Networks (NN) have been used in many pattern classification applications. However, the present invention believes there is a lot of room for further improvement. This is because SVM and non-deep NN have only one or two layers of tunable parameters. Since pattern recognition and concentration estimation are complex and involve sophisticated features, SVM and non-deep NN may be restricted in achieving high classification rate.

SUMMARY OF THE INVENTION

The present invention aims to improve the spatial resolution of the WV-3 VNIR and SWIR images. Specifically, the resolution of VNIR bands will be enhanced from 1.2 m to 0.31 m and the SWIR bands will be enhanced from 7.5 m to 0.31 m.

One embodiment of the present invention is a parallel one-step approach, which has two modules that can be executed in parallel. Module 1 and Module 2 generate eight VNIR bands and eight SWIR bands with 0.31 m resolution, respectively.

Another embodiment of the present invention describes a sequential fusion approach. In the first step, the panchromatic (PAN) band and the eight VNIR bands are fused to yield eight VNIR bands with 0.31 m resolution. In the second step, the eight high-resolution VNIR bands are fused with the eight SWIR bands to generate eight SWIR bands with 0.31 m resolution.

Another embodiment of the present invention is a sequential-parallel fusion approach. The eight VNIR bands are fused with the eight SWIR bands to generate eight SWIR bands with 1.2 m resolution. After that, two modules are running in parallel. One fuses the pan and eight VNIR bands to generate eight VNIR bands with 0.31 m resolution. The other module fuses the PAN band with the eight pan-sharpened SWIR bands (1.2 m resolution) to yield eight SWIR bands with 0.31 m resolution.

Another embodiment of the present invention is a parallel-sequential fusion approach. In the parallel step, two modules are used to generate eight VNIR bands with 0.31 m resolution and eight SWIR bands with 1.2 m resolution. In the sequential step, the outputs of the parallel step are fused to generate 8 SWIR bands with 0.31 m resolution.

Another embodiment of the present invention is a hybrid color mapping algorithm, which is fast and has high performance for image fusion.

Another embodiment of the present invention is to adopt a novel anomaly detection algorithm that can process the fused high spatial resolution images and generate alerts for regions that are different from the neighbors.

Another embodiment of the present invention is to apply a novel sparsity based algorithm for classification for surface materials.

Another embodiment of the present invention is to incorporate an accurate Deep Neural Network (DNN) algorithm for concentration estimation of certain materials on the Earth surface.

Another embodiment of the present invention is that the processing software can be executed in a local personal computer or in a Cloud.

Another embodiment of the present invention is to provide user friendly graphical user interface (GUI) that will allow operators to visualize the fused high resolution images.

BRIEF DESCRIPTION OF THE DRAWINGS

FIGS. 11(a) & (b) illustrate Face images of Subject-1 in 64 different lighting conditions in the Yale B face database.

DETAILED DESCRIPTION OF THE INVENTION

The present invention presents four fusion approaches, which can be directly applied to Worldview-3 images. Moreover, they can also be applied to other current or future satellite images that have similar characteristics of Worldview-3. The present invention also presents data processing methods, including image fusion method, anomaly detection method, material classification method, and concentration estimation method that utilize the high-resolution images generated by the fusion methods.

Approach 1: Parallel One-Step Fusion

Figure 1:
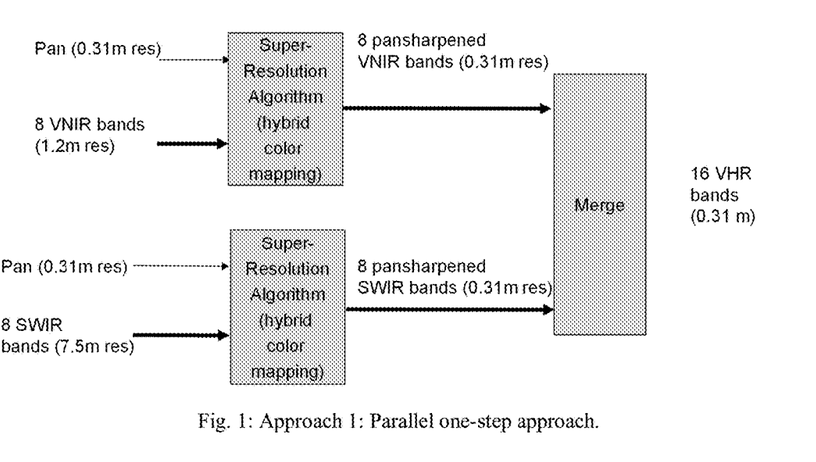
FIG. 1 illustrates an Approach 1: Parallel one-step fusion approach.

As shown in FIG. 1, the first approach involves two parallel modules. Module 1 fuses the panchromatic and the eight VNIR bands to generate eight VNIR bands with 0.31 m resolution. Module 2 fuses the panchromatic and the eight SWIR bands to generate eight SWIR bands with 0.31 m resolution. The outputs of Modules 1 and 2 are merged to form a 16-band image cube. The two modules can be executed in parallel.

Approach 2: Sequential Fusion

Figure 2:
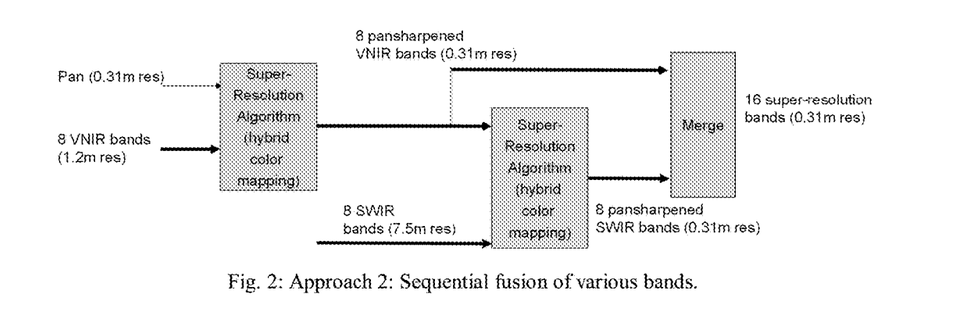
FIG. 2 illustrates an Approach 2: Sequential fusion of various bands.

FIG. 2 shows the sequential method. First, the pan and the eight VNIR bands are fused to generate 8 high resolution VNIR bands with 0.31 m resolution. Second, the eight pan-sharpened VNIR bands are fused with the eight SWIR bands to generate eight pan-sharpened SWIR bands. Finally, the high-resolution bands are merged into a single image cube.

Approach 3: Sequential-Parallel Fusion

Figure 3:
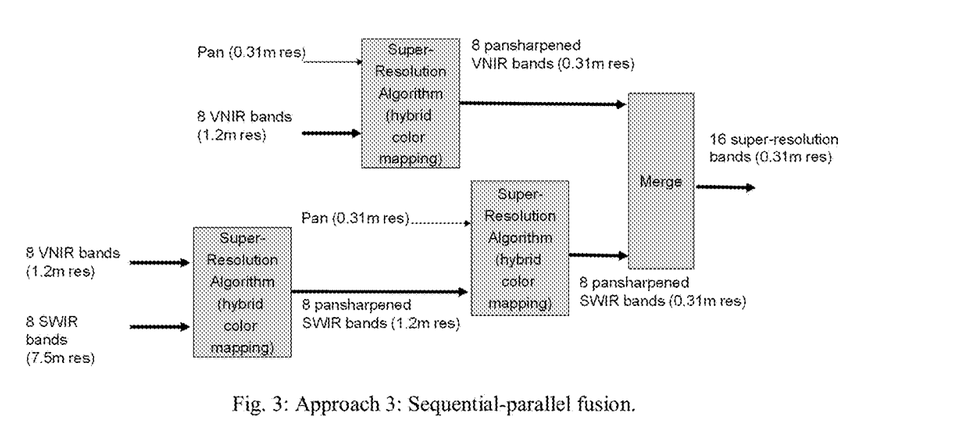
FIG. 3 illustrates an Approach 3: Sequential-parallel fusion.

FIG. 3 shows a sequential-parallel fusion approach. There are two parallel paths. The first path has only one step, which involves the fusion of the pan and the eight VNIR bands to yield eight pan-sharpened bands with 0.31 m resolution. The second path has two steps where Step 1 involves the fusion of eight VNIR and eight SWIR bands to generate eight pan-sharpened SWIR bands with 1.2 m resolution. Step 2 of the second path involves the fusion of the pan band with the outputs of Step 1 to generate high resolution SWIR bands with 0.31 m resolution. Finally, the outputs of the two paths are merged together to form a 16-band High-Resolution (HR) image cube with 0.31 m resolution.

Approach 4: Parallel-Sequential Fusion

Figure 4:
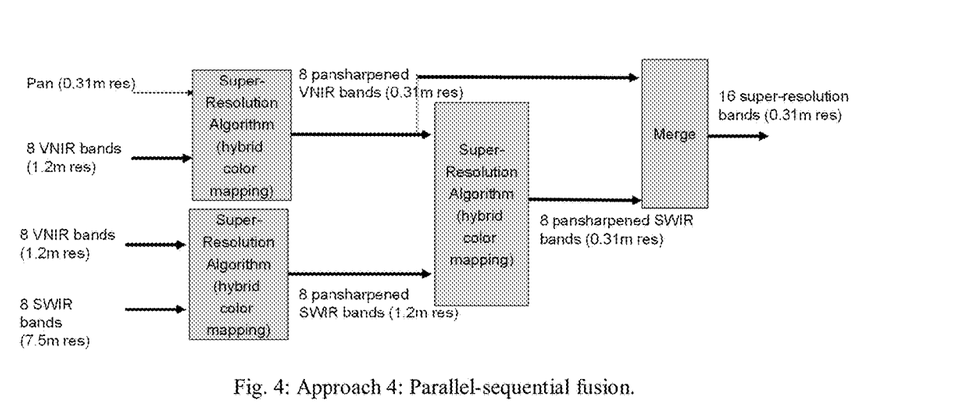
FIG. 4 illustrates an Approach 4: Parallel-sequential fusion.

FIG. 4 illustrates the parallel-sequential fusion approach. Module 1 is the fusion of the PAN band and the eight VNIR bands and Module 2 is the fusion of eight VNIR and eight SWIR bands. Both modules can be executed in parallel. Module 3 then fuses the outputs of Modules 1 and 2 to generate eight high resolution SWIR bands. Finally, the outputs of Module 1 and Module 3 are merged to form a 16-band HR image cube.

Color Mapping

Figure 5:
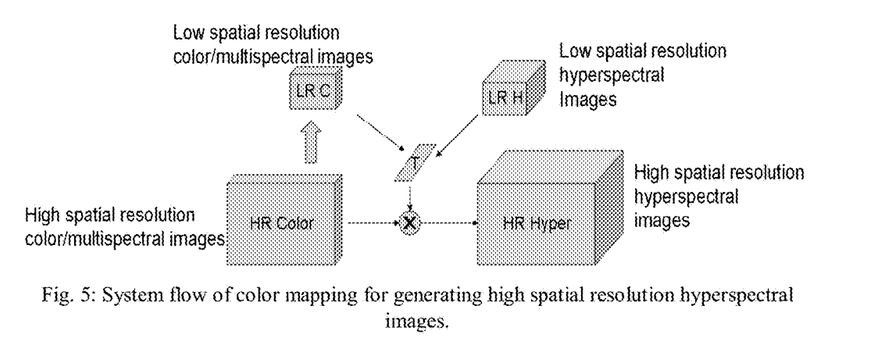
FIG. 5 illustrates a system flow of color mapping. This approach can be used to generate high spatial resolution hyperspectral images.

The idea of color mapping is as the name suggests: mapping a multispectral pixel to a hyperspectral pixel. Here, multispectral images encompass color R-G-B images. This mapping is based on a transformation matrix T, i.e.

$$X=Tx,$$

where X is one (or more) hyperspectral pixels and x is one (or more) multispectral pixels. To get the transformation matrix, the present invention simulates a low resolution multispectral image and use the low resolution hyperspectral image to train the T. FIG. 5 shows the system flow.

Training is done by minimizing the mean square error:

$$T^* = \arg\min_T \ \|H - TC\|_F,$$

where H is the set of hyperspectral pixels and C is the set of multi-spectral pixels. With enough pixels, the optimal T can be determined with:

$$T=XC^T(CC^T)^{-1}.$$

Hybrid Color Mapping

The present invention proposes a fusion algorithm, known as Hybrid Color Mapping (HCM) to perform the fusion in all four fusion approaches mentioned above. HCM is simple to implement, efficient, parallelizable and fast. The details can be found in the mentioned pending patents and papers by the present inventor. For completeness, the HCM algorithm is included in the following few paragraphs.

Extensive studies and results show that the method used in the present invention can generate highly accurate, high resolution reconstruction than the normal simple bicubic scaling and other state-of-the-art methods. In addition, the present invention conducted extensive classification study using reconstructed images. Results show that the method used in the present invention performs much better than other methods.

Figure 6:
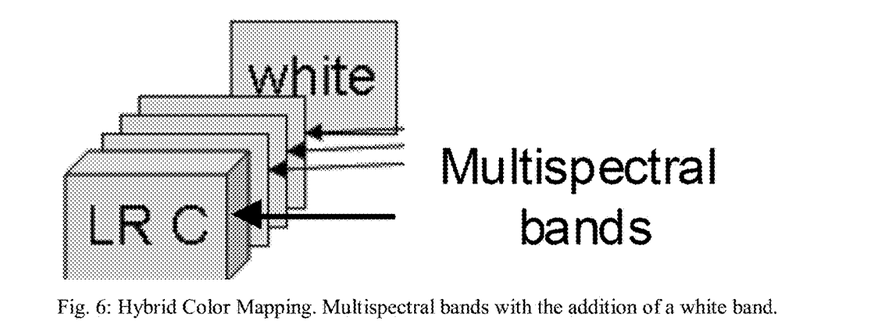
FIG. 6 illustrates a hybrid color mapping, combining Multispectral bands with the addition of a white band.

For many hyperspectral images, the band wavelengths range from 0.4 to 2.5 um. For color/multispectral images, the bands may include R-G-B, and some additional spectral bands. As shown in FIG. 6, the present invention also adds a white band, i.e. all the pixel values are 1. This white band can be used to compensate for atmospheric effect and other bias effects. Mathematically, adding a white band is equivalent to increasing one more column in the T matrix. Hence, the present invention has more parameters to adjust in the transformation.

Local Color Mapping

Figure 7:
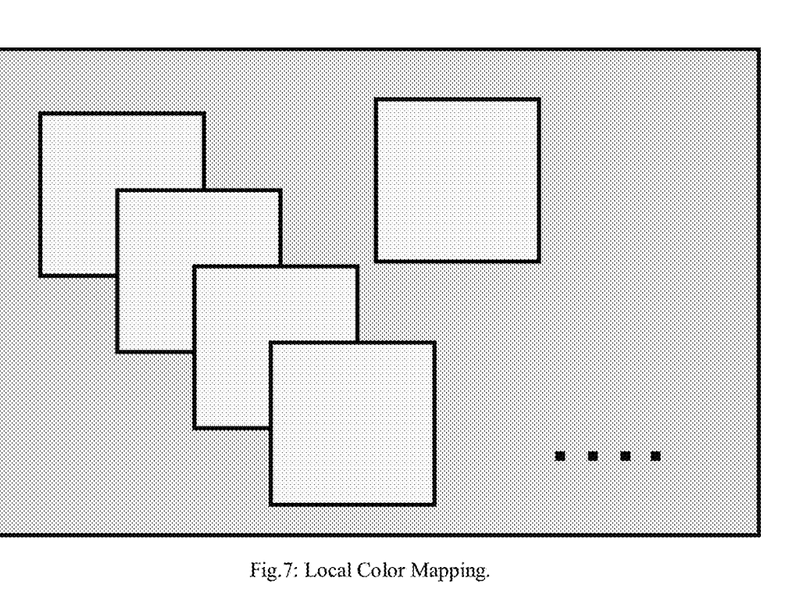
FIG. 7 illustrates a local color mapping.

The present invention further enhances the method by applying color mapping patch by patch as shown in FIG. 7. A patch is a sub-image in the original image. Each patch will have a local transformation matrix. In this way, spatial correlation can be exploited. In addition, since the task is split into many small tasks, the process can be easily parallelized.

Experiment

Figure 8:
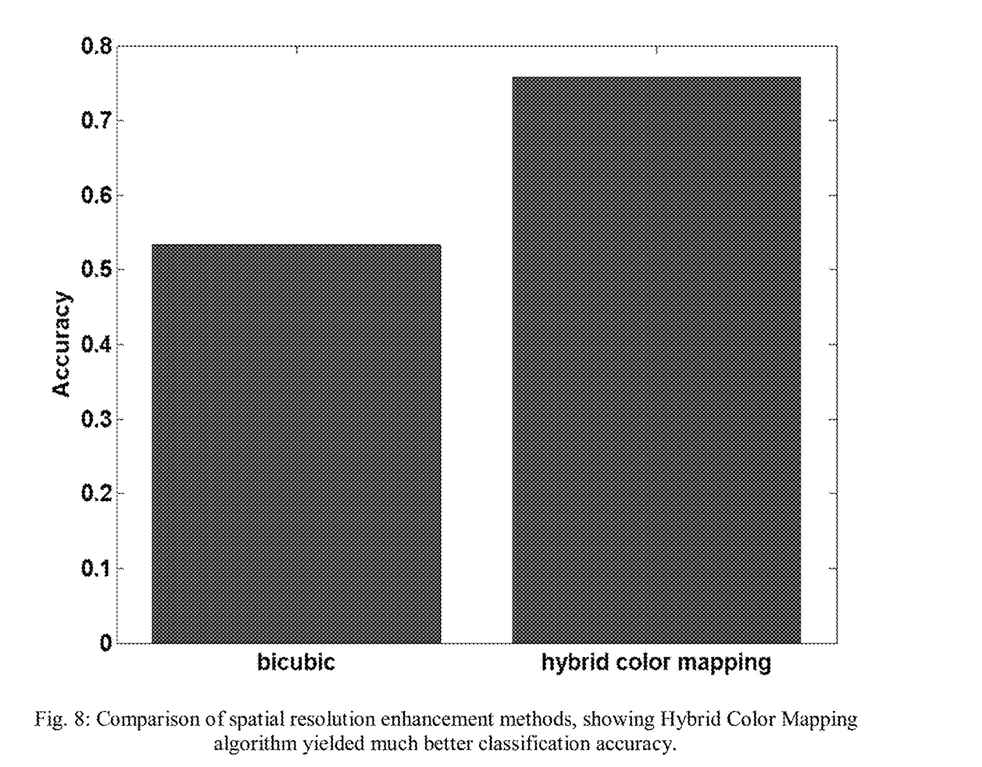
FIG. 8 illustrates a comparison of spatial resolution enhancement methods, showing the hybrid color mapping algorithm yielded much better classification accuracy.

The present invention used the NASA Airborne Visible/Infrared Imaging Spectrometer (AVIRIS) hyperspectral data in this study. In each experiment, the image was downscaled by three times using Bicubic Interpolation (BI) method. The downscaled image was used as low resolution hyperspectral image. The R-G-B bands were picked from the original high resolution hyperspectral image for color mapping. The bicubic method in the following plots was implemented by upscaling the low-resolution image using BI. The results of the bicubic method were used as a baseline for comparison study. As shown in FIG. 8, it shows classification results using the endmembers extracted from ground truth AVIRIS hyperspectral image. The AVIRIS image has 213 bands with wavelengths range from 380 nm to 2500 nm. Also, the hybrid color mapping is significantly better than the bicubic method.

Material Classification Algorithm

The present invention proposes to apply the latest development in sparsity based classification algorithm to rock type classification. Similarly, the approach of the present invention requires some spectral signatures to be available as in other methods mentioned.

Figure 10:
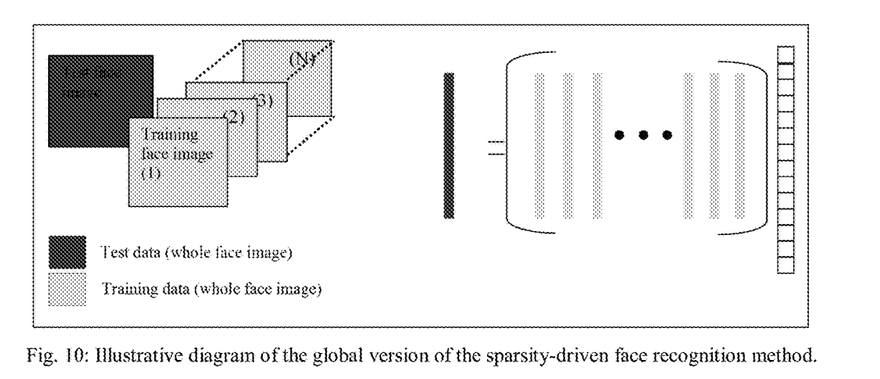
FIG. 10 illustrates the global version of the sparsity-driven face recognition method.

The present invention implemented a sparsity-driven recognition method in the articles and papers mentioned. In the sparsity-driven face recognition approach, the assumption is that a face image of subject i lies in the linear span of the existing face images for that same subject i in the training set. Suppose $\{v_{i1}, v_{i2}, \ldots, v_{iD}\}$ are the vectorized D face images of subject i in the training set, and y is a new vectorized face image of subject i, which is not in the training set. Based on this assumption, y, can be expressed as:

$$y = \alpha_{i1}v_{i1} + \alpha_{i2}v_{i2} + \ldots + \alpha_{iD}v_{iD} = [v_{i1}\ v_{i2}\ \ldots\ v_{iD}]\begin{bmatrix}\alpha_{i1}\\ \alpha_{i2}\\ \vdots\\ \alpha_{iD}\end{bmatrix} = A_i\alpha_i \quad (1)$$

Suppose there are C human subjects; the above expression can then be expanded as in (2) and this expression indicates that y is the sparse linear combination of face images in the training set.

$$y = [A_1\ A_2\ \ldots\ A_C]\begin{bmatrix}\alpha_1\\ \alpha_2\\ \vdots\\ \alpha_C\end{bmatrix} = Ax \quad (2)$$

The sparse representation, $x_0=[0\ \ldots\ 0\ \alpha_i^T 0\ \ldots\ 0]$, thus yields the membership of y to subject i. The above framework to small contact detection can be easily extended. Each contact image will be vectorized and put into the dictionary.

Referring to FIG. 10, it depicts an illustrative diagram of the global version. In the global version, the whole face image is vectorized and the sparsity coefficient vector estimations are done using these whole-face image vectors.

Figure 11:
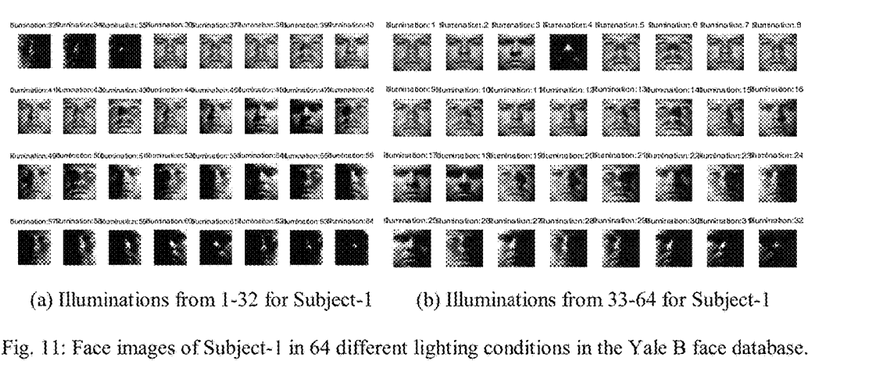

As shown in FIG. 11, the recognition performance of the global version (i.e. the use of the whole face) of the sparsity-driven face recognition method has been examined on the Extended Yale B face database. There are thirty-eight subjects and each subject has sixty-four faces with different illuminations. In addition to considering only the frontal images, the test face images are also rotated at four different rotational degrees to see how the performance of the sparsity-driven face recognition method will be affected. It should be noted that the down-sampled images of Extended Yale B face database of size 32×28 are used in this work. Additionally, when rotational effects are introduced to the test face images, the original size image (192×168) has been rotated and then down-sampling is applied to the rotated test image. It should be also noted that rotational effects are only applied to the face images in the testing set, but not to the face images in the training set. Specifically, the dictionary only contains the frontal face images.

Figure 12:
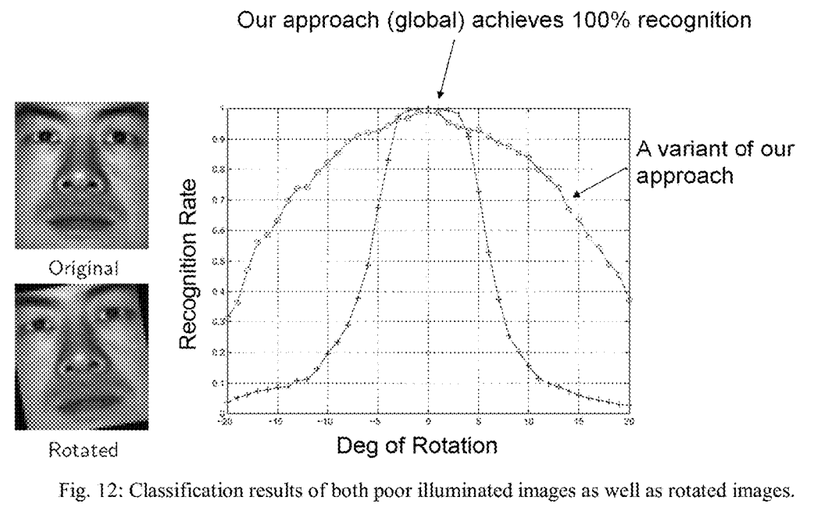
FIG. 12 illustrates classification results of the algorithm of the present invention.

As shown in FIG. 12, a maximum recognition rate of 100% has been achieved. This high recognition rate is quite remarkable, considering there are a number of poor illuminated images as shown in FIG. 10.

Concentration Estimation Algorithm

The present invention proposes to apply Deep Neural Network (DNN) techniques to further improve the chemical element classification and composition estimation performance in surface monitoring such as volcano monitoring. Possible applications include ash detection, composition estimation, and $SO_2$ concentration estimation. The present invention adapts two of the DNN techniques, the Deep Belief Network (DBN) and Convolutional Neural Network (CNN), respectively, to the element classification and chemical composition estimation problem.

DNN techniques have the following advantages:
i. Better capture of hierarchical feature representations;
ii. Ability to learn more complex behaviors;
iii. Better performance than conventional methods;
iv. Use distributed representations to learn the interactions of many different factors on different levels;
v. Can learn from unlabeled data such as using the Restricted Boltzmann Machines (RBM) pretraining method; and
vi. Performance can scale up with the number of hidden layers and hidden nodes on fast GPUs.

One of the applications in which DNN techniques have proved themselves is the handwritten digit recognition application. The present invention applied the Deep Belief Network (DBN) technique to the Laser Induced Breakdown Spectroscopy (LIBS) spectrum database (sixty-six samples) based on preliminary investigation in the past. The total number of oxides is nine and these nine oxide compounds are:
1) $SiO_2$;
2) $TiO_2$;
3) $Al_2O_3$;
4) $Fe_2O_3$;
5) MnO;
6) MgO;
7) CaO;
8) $Na_2O$;
9) $K_2O$.

Figure 13:
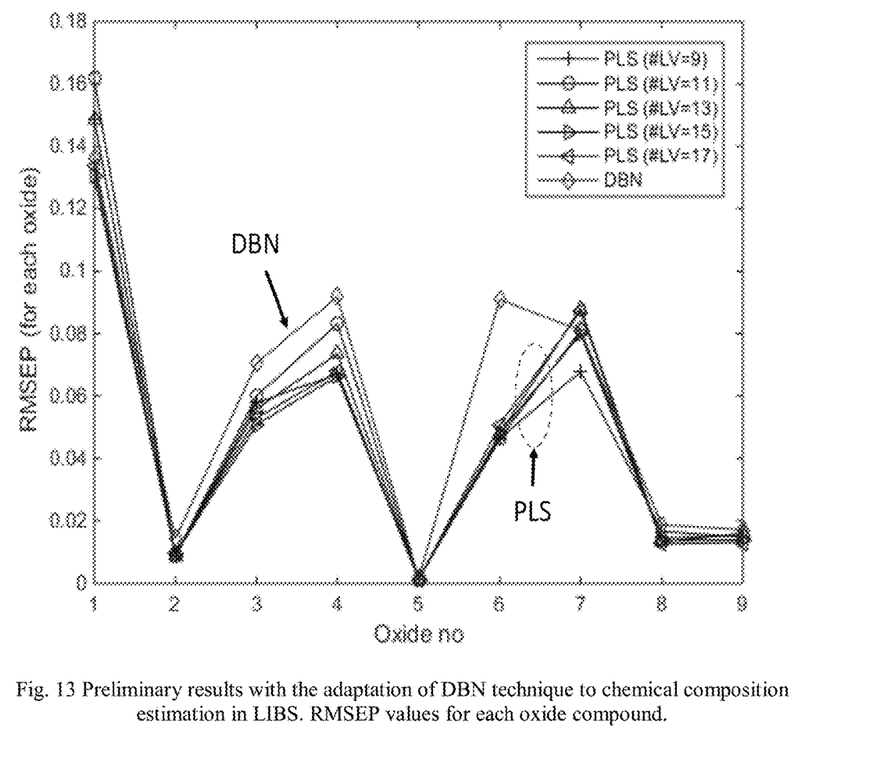
FIG. 13 illustrates preliminary results with the adaptation of Deep Belief Network (DBN) technique to chemical composition estimation in Laser Induced Breakdown Spectroscopy (LIBS).

A Leave-One-Out (LOO) testing framework is applied to the LIES dataset of sixty-six samples to estimate oxide compositions. Two performance measures are computed: a) ERRORSUM, the sum of absolute error in the sample estimate and its ground truth, b) RMSEP, to assess the estimation accuracy for each of the nine oxide compounds. The initial results were quite encouraging for a DBN with 3-Level architecture. Level-1: RBM with 50 hidden units; Level-2: RBM with 50×50 hidden units; and Level-3: connection to output with NN with 1000 epochs. Comparable results for DBN to the Partial Least Square (PLS) technique were observed. The resultant performance measures with PLS and DBN technique is shown in FIG. 13. It is quite likely to see further improvement in the composition estimation results after customization of the DBN architecture, and the number of hidden DBN units.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

The invention claimed is:

1. A system for generating high resolution super-spectral images, comprising:
a panchromatic (PAN) band module having an output generating a panchromatic band of 0.31 m resolution;
a Visible Near Infrared (VNIR) band module having outputs generating eight VNIR bands of 1.2 m resolution;
a Short-Wave Infrared (SWIR) band module having outputs generating eight SWIR bands of 7.5 m resolution;
a first Super-Resolution Algorithm Module (SRAM) having an output generating eight pan-sharpened VNIR bands of 0.31 m resolution by combining the outputs of the PAN band module and the VNIR band module;
a second Super-Resolution Algorithm Module (SRAM) having an output generating eight pan-sharpened SWIR bands of 0.31 m resolution by combining the outputs of the PAN band module and the SWIR band module; and
a merger module having a Hybrid Color Mapping (HCM) algorithm to merge the outputs from the first and second SRAMs in a parallel one-step approach and generate sixteen High-Resolution (HR) bands of 0.31 m resolution.

2. A system for generating high resolution super-spectral images in accordance to claim 1, further comprising:
an anomaly detection module for detecting high spatial resolution images regions that are different from the neighbors; and
a sparsity based classification module for classification of surface materials.

3. A method for generating high resolution super-spectral images comprising the steps of:
generating a Panchromatic (PAN) band of 0.31 m resolution;
generating eight Visible Near Infrared (VNIR) bands of 1.2 m resolution;
generating eight Short-Wave Infrared (SWIR) bands of 7.5 m resolution;
generating eight pan-sharpened VNIR bands of 0.31 m resolution by combining the PAN band and the eight VNIR bands;
generating eight pan-sharpened SWIR bands of 0.31 m resolution by combining the PAN band and the eight SWIR bands; and
merging, in a parallel one-step approach, the eight pan-sharpened VNIR bands and the eight pan-sharpened SWIR bands to generate sixteen High-Resolution (HR) bands of 0.31 m resolution.

* * * * *